United States Patent
Yao et al.

(10) Patent No.: US 6,950,288 B2
(45) Date of Patent: Sep. 27, 2005

(54) INTEGRATED METHOD AND DEVICE FOR A DUAL STAGE MICRO-ACTUATOR AND SUSPENSION DESIGN FOR THE HARD DISK DRIVER

(75) Inventors: Ming Gao Yao, Dongguan (CN); Masashi Shiraishi, Kowloon (JP); Yi Ru Xie, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 10/352,757

(22) Filed: Jan. 27, 2003

(65) Prior Publication Data

US 2004/0070887 A1 Apr. 15, 2004

(30) Foreign Application Priority Data

Oct. 9, 2002 (WO) .............................. PCT/CN02/00712

(51) Int. Cl.[7] .............................................. G11B 5/596
(52) U.S. Cl. .................................. 360/294.4; 360/234.5
(58) Field of Search ........................... 360/234.5, 294.4, 360/294.6, 234.6, 245, 245.9

(56) References Cited

U.S. PATENT DOCUMENTS

| | | | |
|---|---|---|---|
| 6,331,923 B1 | 12/2001 | Mei ......................... | 360/294.4 |
| 6,353,515 B1 * | 3/2002 | Heim ........................ | 360/245.9 |
| 6,459,548 B1 * | 10/2002 | Shiraishi et al. .......... | 360/245.9 |
| 6,539,609 B2 * | 4/2003 | Palmer et al. ............ | 360/245.9 |
| 6,671,131 B2 * | 12/2003 | Kasajima et al. ......... | 360/294.4 |
| 6,700,749 B2 * | 3/2004 | Shiraishi et al. .......... | 360/294.4 |

* cited by examiner

*Primary Examiner*—Robert S. Tupper
(74) *Attorney, Agent, or Firm*—Kenyon & Kenyon (57) ABSTRACT

A system and method using a connection plate to electrically couple a magnetic read/write head to a printed circuit assembly. The connection plate has a set of contact pads to control reads and a set of contact pads to control. The printed circuit assembly also allows control of the micro-actuator arms. The connection plate can be attached to a framing assembly of the micro-actuator by laser welding or by using an ultraviolet cured epoxy.

35 Claims, 12 Drawing Sheets

INTEGRATED METHOD AND DEVICE FOR A DUAL STAGE MICRO-ACTUATOR AND SUSPENSION DESIGN FOR THE HARD DISK DRIVER

BACKGROUND INFORMATION

The present invention relates to magnetic hard disk drives. More specifically, the present invention relates to a method of electrically coupling a slider to a head arm assembly.

Figure 1:
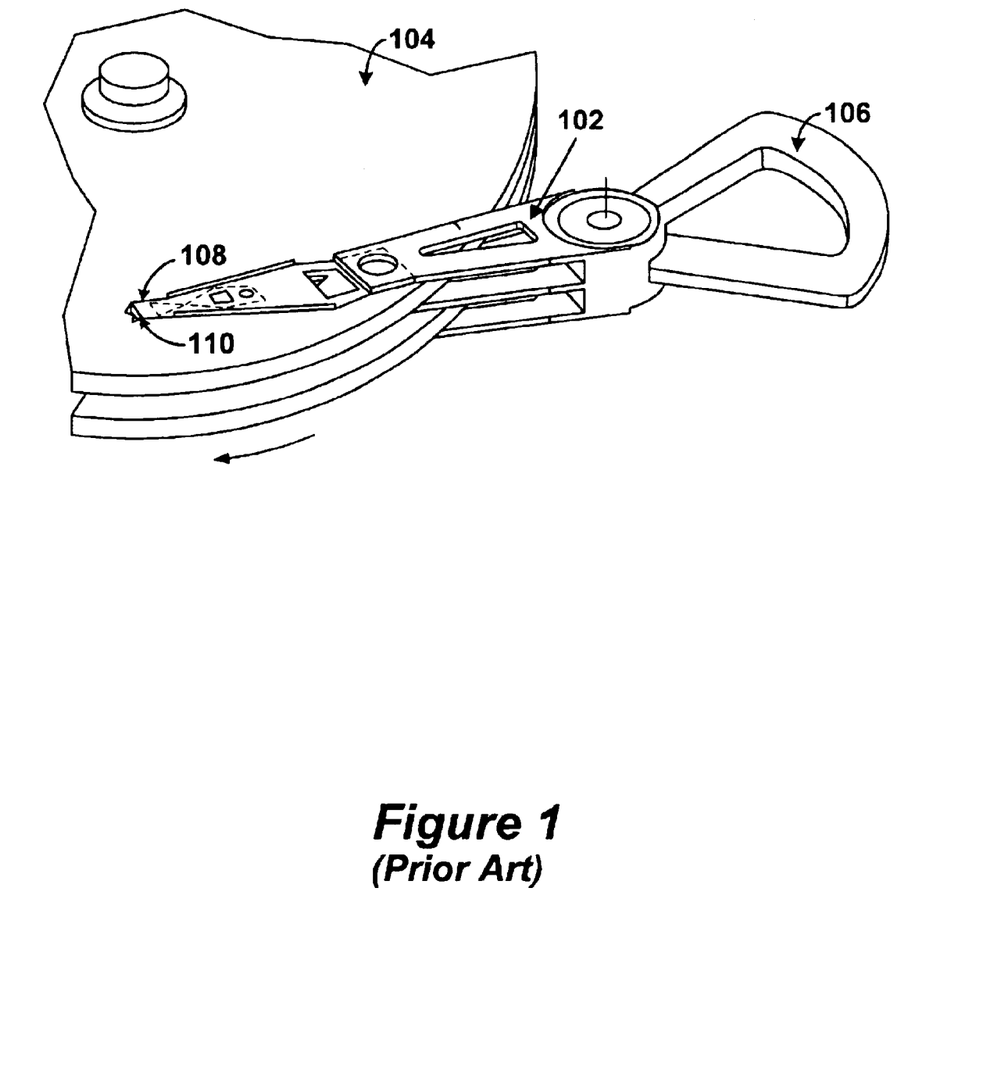
FIG. 1 provides an illustration of an internal view of a hard disk drive including a drive arm configured to read from and write to a magnetic hard disk as used in the art.

In the art today, different methods are utilized to improve recording density of hard disk drives. FIG. 1 provides an illustration of a typical disk drive with a drive arm 102 configured to read from and write to a magnetic hard disk 104. Often, voice-coil motors (VCM) 106 are used for controlling a hard drive's arm 102 motion across a magnetic hard disk 106. Because of the inherent tolerance (dynamic play) that exists in the placement of a recording head 108 by a VCM 106 alone, micro-actuators 110 are now being utilized to 'fine-tune' head 108 placement. A VCM 106 is utilized for course adjustment and the micro-actuator 110 then corrects the placement on a much smaller scale to compensate for the VCM's 106 (with the arm 102) tolerance. This enables a smaller recordable track width, increasing the 'tracks per inch' (TPI) value of the hard drive (increased drive density).

Figure 2:
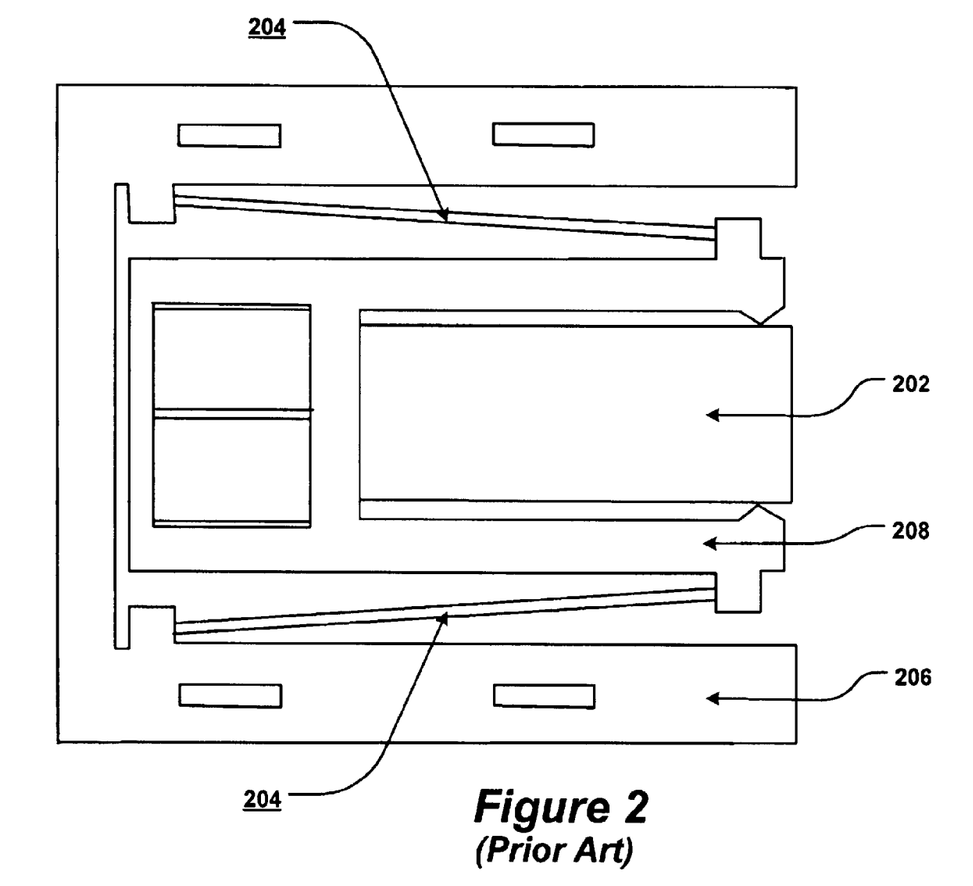
FIG. 2 provides an illustration of a micro-actuator as used in the art.

FIG. 2 provides an illustration of a micro-actuator as used in the art. Typically, a slider 202 (containing a read/write magnetic head; not shown) is utilized for maintaining a prescribed flying height above the disk surface 104 (See FIG. 1). Micro-actuators may have flexible beams 204 connecting a support device 206 to a slider containment unit 208 enabling slider 202 motion independent of the drive arm 102 (See FIG. 1). An electromagnetic assembly or an electromagnetic/ferromagnetic assembly (not shown) may be utilized to provide minute adjustments in orientation/location of the slider/head 202 with respect to the arm 102 (See FIG. 1).

Developing a method of coupling the micro-actuator to the HGA without distortion is difficult. Distortion of the micro-actuator can weaken its structure, reducing effectiveness and making the micro-actuator more vulnerable to shocks. Distortion can also increase the likelihood of particle generation. What is needed is a micro-actuator design that allows for several variations without sacrificing shock performance or increasing particle generation.

DETAILED DESCRIPTION

A system and method is described using a connection plate to electrically couple a magnetic read/write head to a printed circuit assembly. In one embodiment, the connection plate has a set of contact pads to control read operations and a set of contact pads to control write operations. In a further embodiment, the printed circuit assembly also allows control of the micro-actuator arms. In one embodiment, the connection plate can be attached to a framing assembly of the micro-actuator by laser welding or by using an ultraviolet cured epoxy.

Figures 3A, 3B:
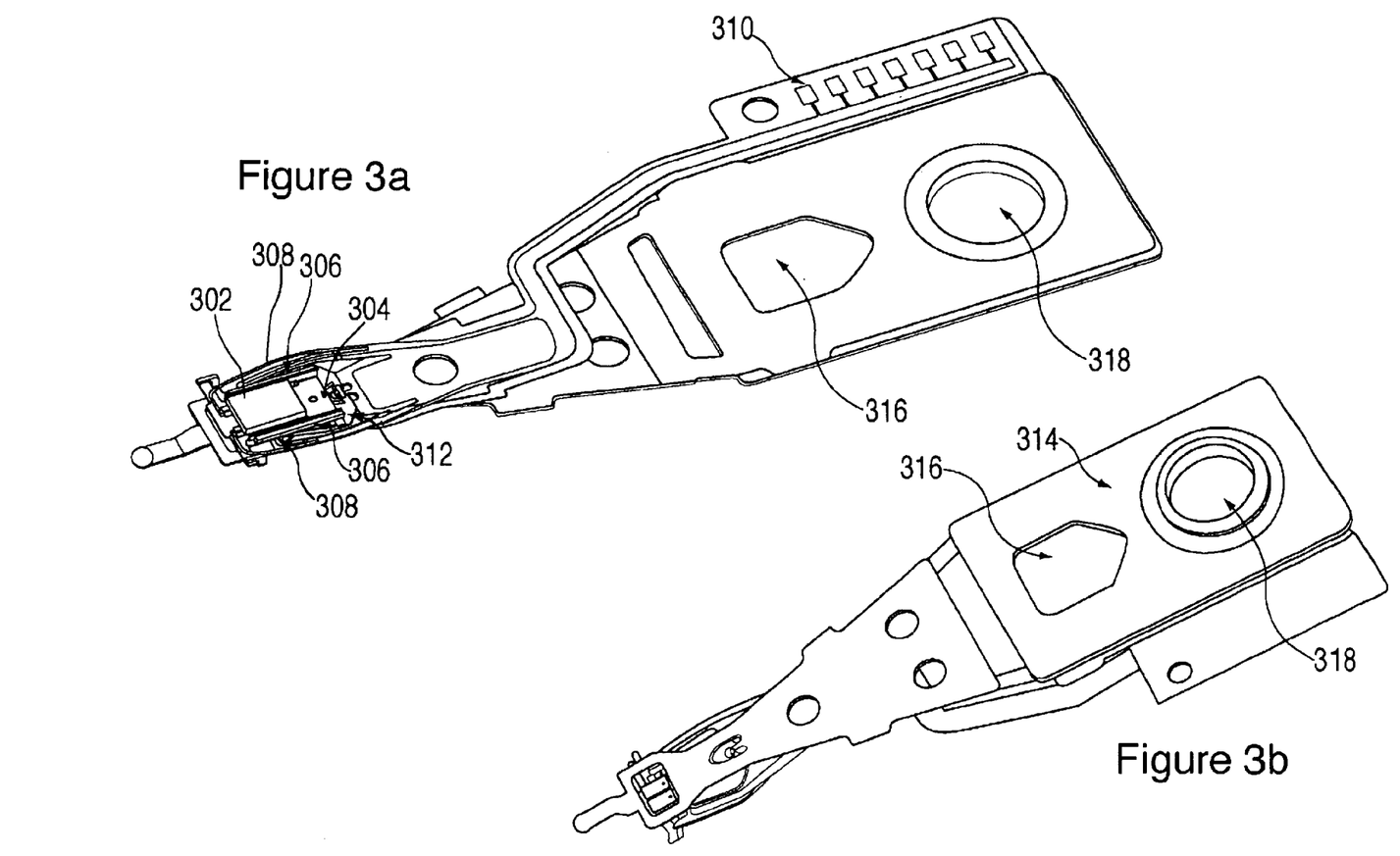
FIGS. 3a–b describes a hard disk drive head gimbal assembly (HGA) with a 'U'-shaped micro-actuator under principles of the present invention.

Illustrated in an upside-down orientation, FIG. 3a describes one embodiment of a hard disk drive head gimbal assembly (HGA) with a 'U'-shaped micro-actuator. In one embodiment, a magnetic read/write head, or slider, 302 is coupled to a framing assembly 304 forming a 'U'-shaped micro-actuator. In a further embodiment, the 'U'-shaped micro-actuator has a piezoelectric Lead Zirconate Titanate, (PZT) beam (arm) 306 attached to an arm 308 on each side of the framing assembly 304. In one embodiment, a printed circuit assembly 310 is electrically coupled to the slider 302 to control reading and writing functions. The micro-actuator 306 is coupled to a suspension tongue 312, the suspension tongue being part of the head gimbal assembly (HGA) 314. A first hole 316 is cut into the HGA 314 to reduce weight. A second hole 318 allows the HGA 314 to be mounted on a pivot. FIG. 3b illustrates the present embodiment in an opposite orientation.

Figure 4A:
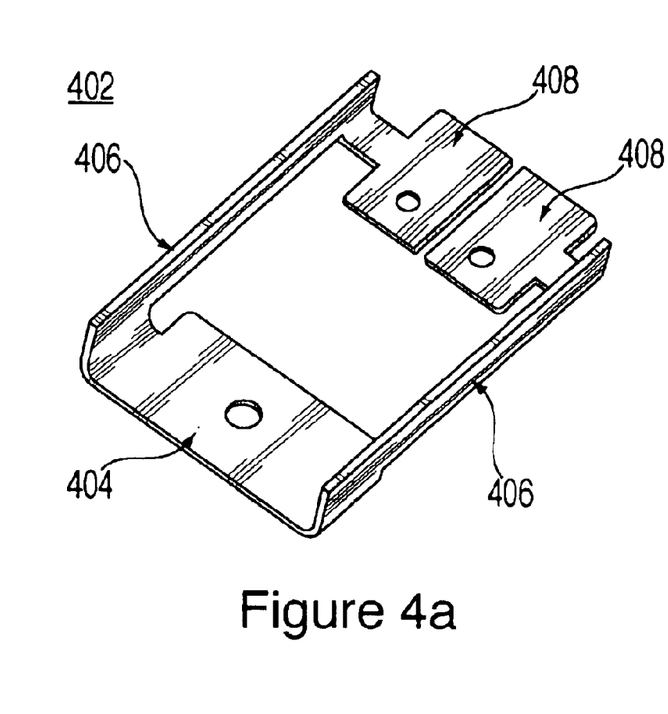
FIGS. 4a–b illustrate one embodiment of the metal framing assembly.
Figure 4B:
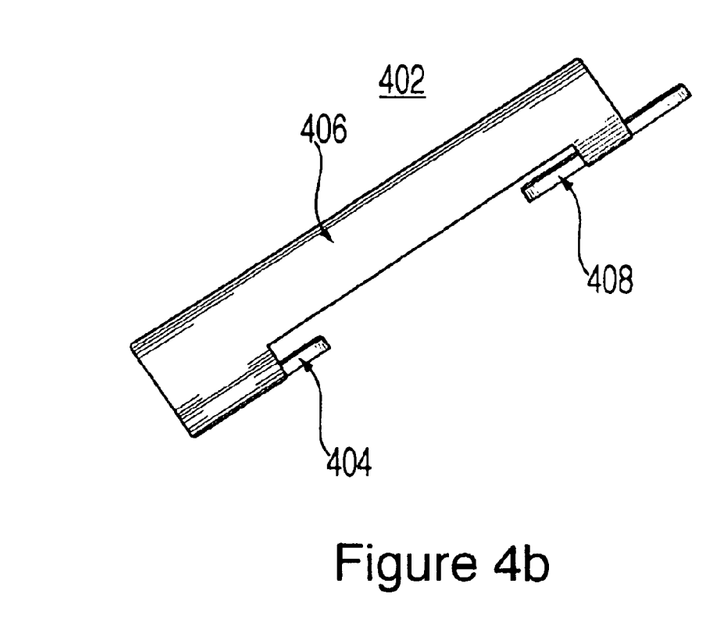

In one embodiment of the present invention, a metal framing assembly 402 is used to construct the micro-actuator. FIG. 4a illustrates a top view of one embodiment of the metal framing assembly 402. A base piece 404 serves as a coupling point at which the framing assembly 402 is coupled to a suspension tongue 312 of the HGA 314. A first arm 406 and a second arm 406 projecting from opposite sides of the base piece 404. In a further embodiment, a first support 408 is coupled to the end of the first arm 406 opposite the base piece 404 and a second support 408 is coupled to the end of the second arm 406 opposite the base piece 404. The first and second supports 408 support the magnetic read/write head 302. FIG. 4b shows a side view of one embodiment of the metal framing assembly 402. The base piece 404 is on a different parallel plane from the supports 408 in order to maintain a parallel gap between the magnetic read/write head 302 and the suspension tongue 312. In one embodiment, the framing assembly is made from stainless steel. In a further embodiment, the framing assembly has a thickness of 25 µm.

Figure 5A:
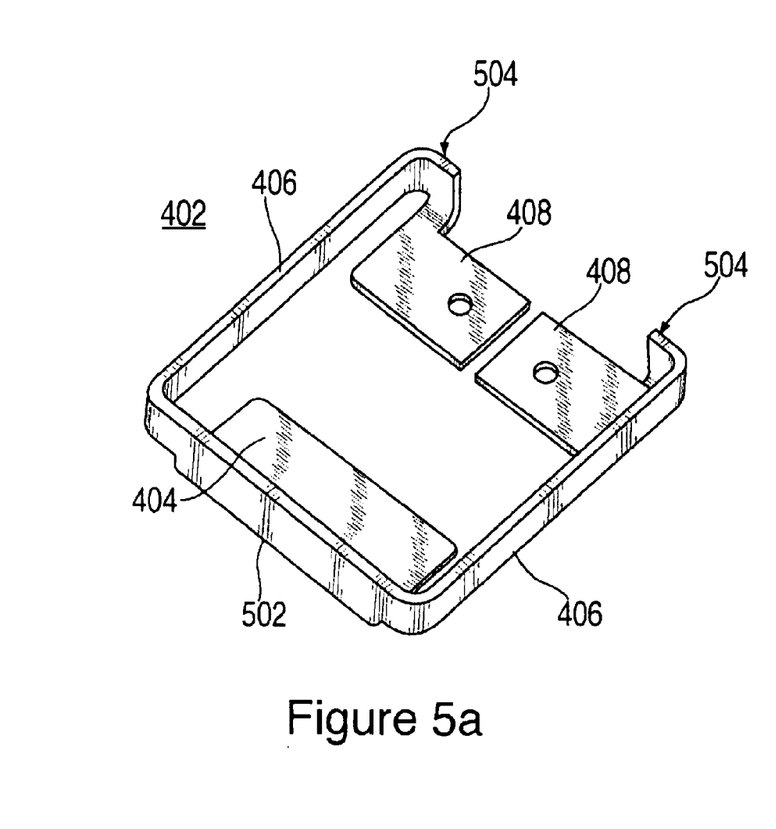
FIGS. 5a–b illustrate an alternate embodiment of the framing assembly.
Figure 5B:
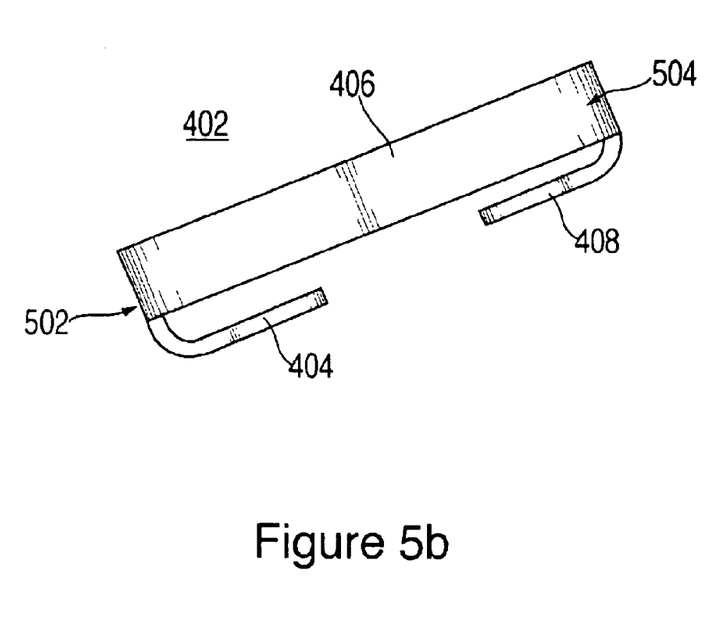

FIG. 5a illustrates a top view of an alternate embodiment of the framing assembly 402. In the alternate embodiment, the two arms 406 are attached to a rear support 502, the rear support 502 having a base piece 404 for coupling to the suspension tongue. In a further embodiment, each arm 406 has an overhang 504, from which the first and second support 408 are attached. FIG. 5b illustrates the alternate embodiment in a side view. In one embodiment, the base piece 404 and the first and second supports 408 are on different planes so as to maintain the parallel gap.

Figure 6:
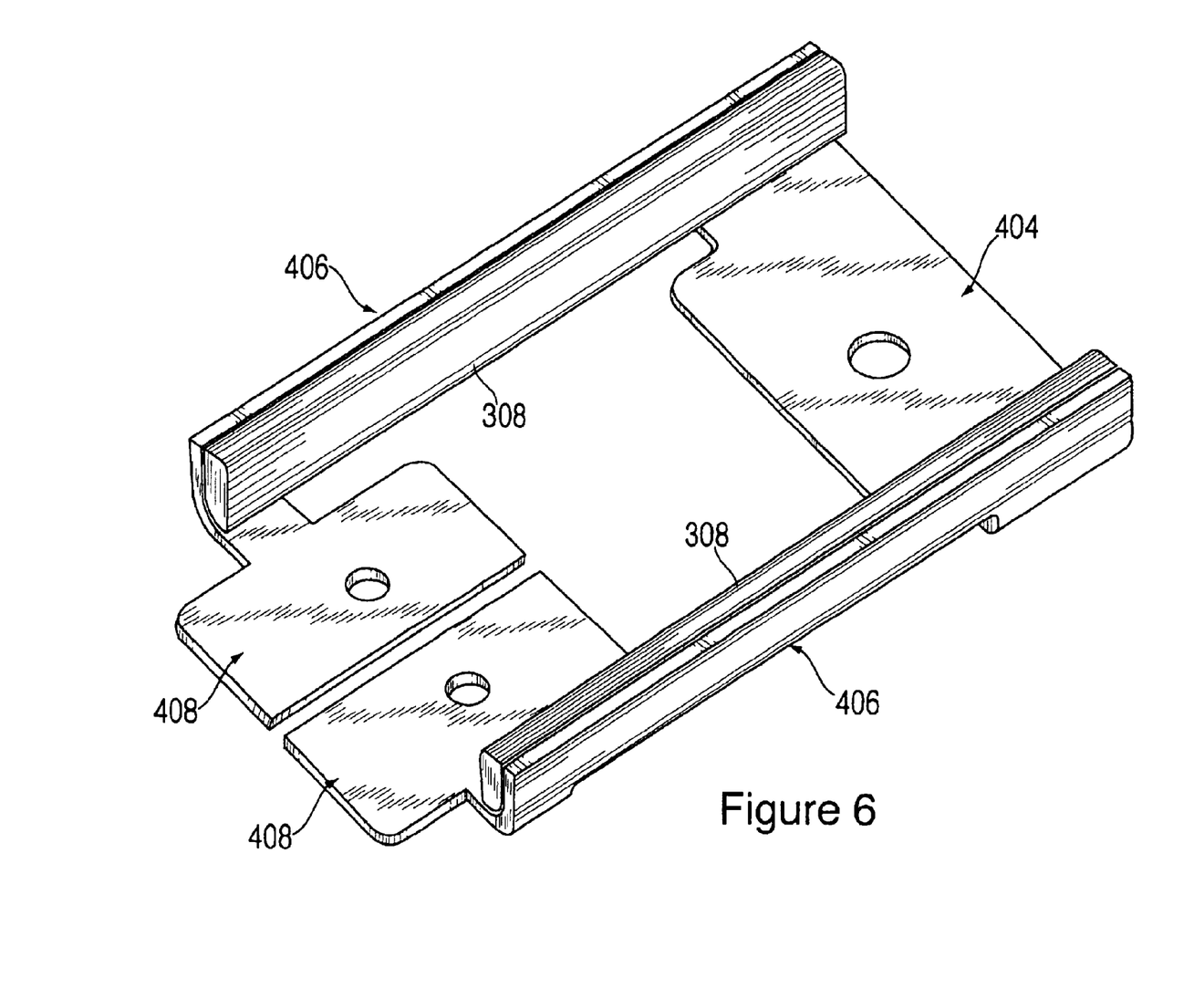
FIG. 6 illustrates one embodiment of the micro actuator.

FIG. 6 illustrates one embodiment of the micro actuator. In one embodiment, a piezoelectric beam 308 is coupled to the interior of each arm 406 of the framing assembly 402. The piezoelectric beam is supported in this embodiment by the connection of the arms 406 to the base 404 and the first and second supports 408. In one embodiment, the piezoelectric beams 308 are coupled to the arms 406 by using an ultraviolet cured epoxy. In one embodiment, the piezoelectric beams 308 are multi-layered.

Figure 7:
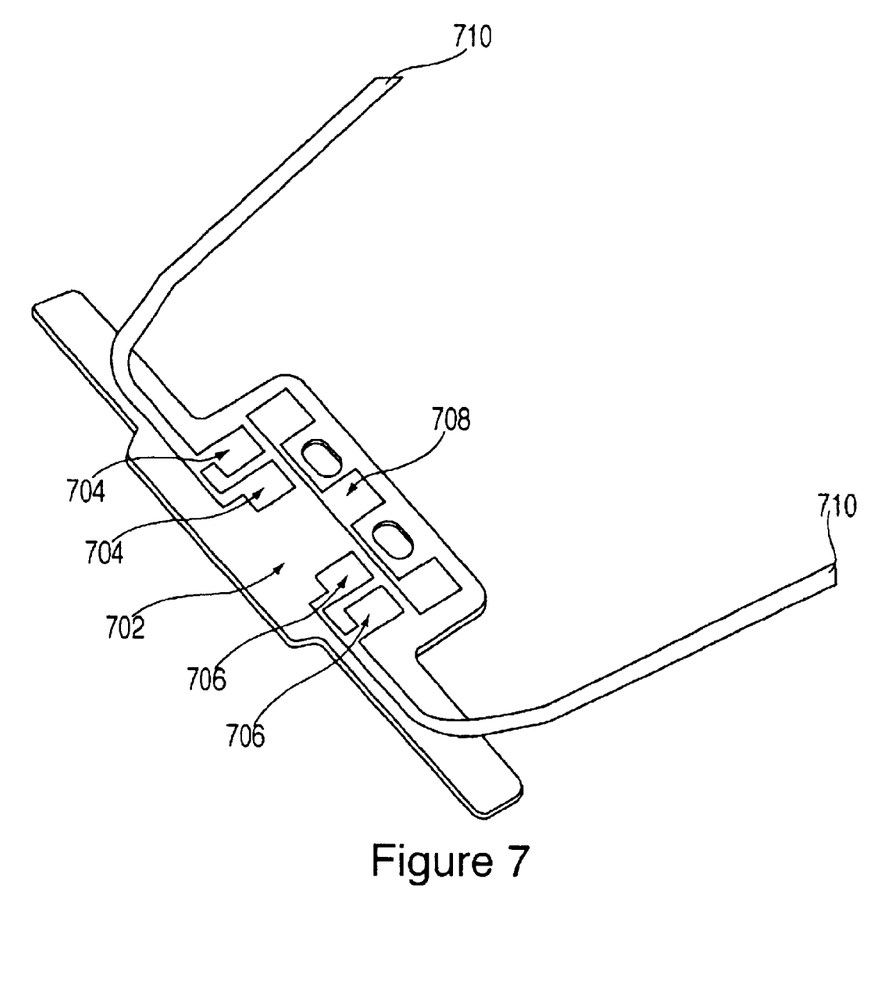
FIG. 7 illustrates one embodiment of a connection plate.

FIG. 7 illustrates one embodiment of a connection plate 702. In one embodiment, a positive and negative read trace 704 is affixed to the front of the connection plate 702. In a further embodiment, a positive and negative write trace 706 is affixed to the front of the connection plate 702. In one embodiment, a gold pattern 708 is affixed by silver epoxy to the back of the connection plate 702. The pattern 708 is used to reduce the contact resistance between the magnetic head 302 and the suspension tongue 312 to prevent electrostatic discharge to the magnetic head. In one embodiment, the read traces 704 and the write traces 706 are connected by a set of electrical connections 710 to the printed circuit assembly 310.

Figure 8:
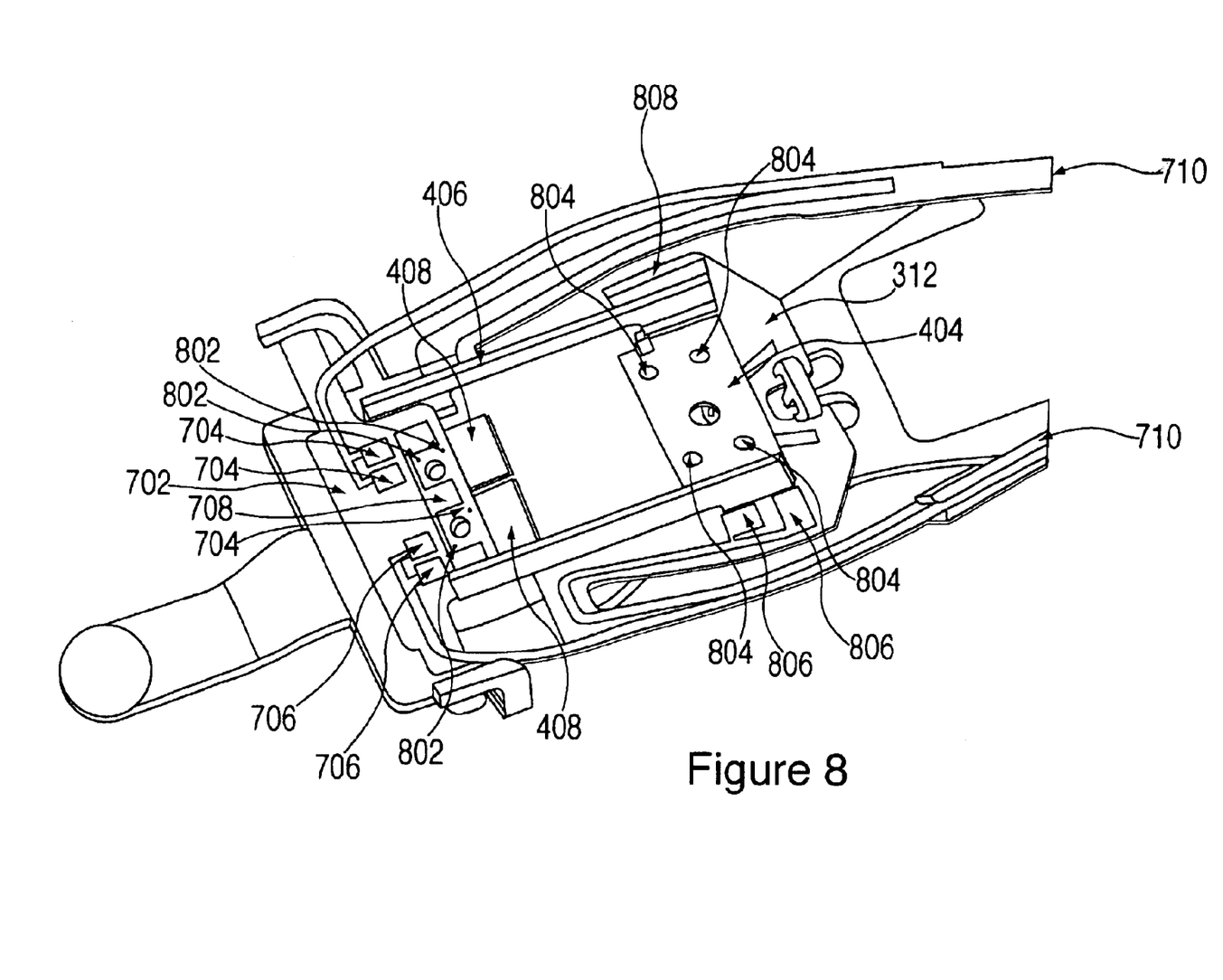
FIG. 8 illustrates a top view of one embodiment of the framing assembly coupled to the HGA.

FIG. 8 illustrates a top view of one embodiment of the framing assembly 402 coupled to the HGA 314. In one embodiment the connection plate 702 is connected to the framing assembly 402 at the first and second supports 408. In one embodiment, laser welding at the welding points 802 connects the connection plate 702 to the supports 408. In an alternate embodiment, an ultraviolet cured epoxy couples the connection plate 702 to the supports 408. The metal framing assembly 402 is coupled to the HGA 314. In one embodiment, the base piece 404 is laser welded to the suspension tongue 312 at the welding points 804. In an alternate embodiment, an ultraviolet cured epoxy couples the metal framing assembly 402 to the suspension tongue 312. In one embodiment, a first set 806 of one or more actuator arm pads is affixed to the suspension tongue 312 adjacent to the first arm 406 of the metal framing assembly 402. In a further embodiment, a second set 808 of one or more actuator arm pads is affixed to the suspension tongue 312 adjacent to the second arm 406 of the metal framing assembly 402. In one embodiment, the second set 806 of actuator arm pads is electrically separate from the first set 808 of actuator arm pads. In one embodiment, the read traces 704, write traces 706, and the first set 806 and second set 808 of actuator pads are all connected by a set of electrical connections 710 to the printed circuit assembly 310.

Figure 9:
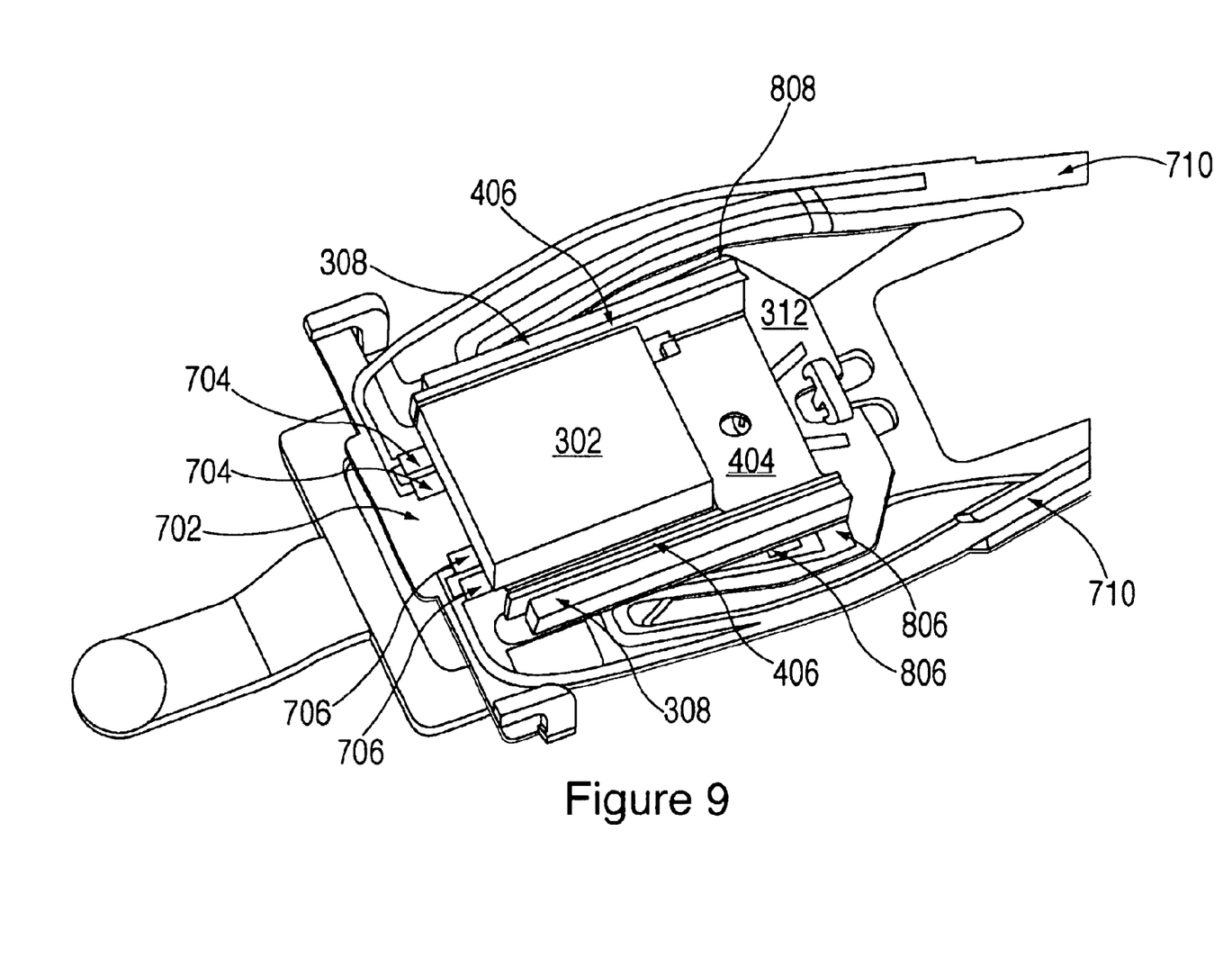
FIG. 9 illustrates in a top view one embodiment of an assembled piezoelectric micro-actuator.

FIG. 9 illustrates in a top view one embodiment of an assembled piezoelectric micro-actuator. In one embodiment, a piezoelectric beam 308 is attached to each arm 406 of the framing assembly. In a further embodiment, each beam is electrically coupled to either the first set of actuator arm pads 806 or the second set of actuator arm pads 808 on the suspension tongue 312. In one embodiment, the first set 806 and the second set 808 of one or more actuator arm pads are electrically coupled to the piezoelectric beams 308 by gold ball bonding. In an alternate embodiment, the first set 806 and the second set 808 of one or more actuator arm pads are electrically coupled to the piezoelectric beams 308 by solder bump bonding. In one embodiment, the magnetic read/write head 302 is coupled to the connection plate 702 on the first support 408 and the second support 408. In one embodiment, the magnetic read/write head 302 is coupled to the first support 408 and the second support 408 by an ultraviolet cured epoxy. In a further embodiment, the magnetic read/write head 302 is electrically coupled to the read traces 704 and the write traces 706.

Figure 10:
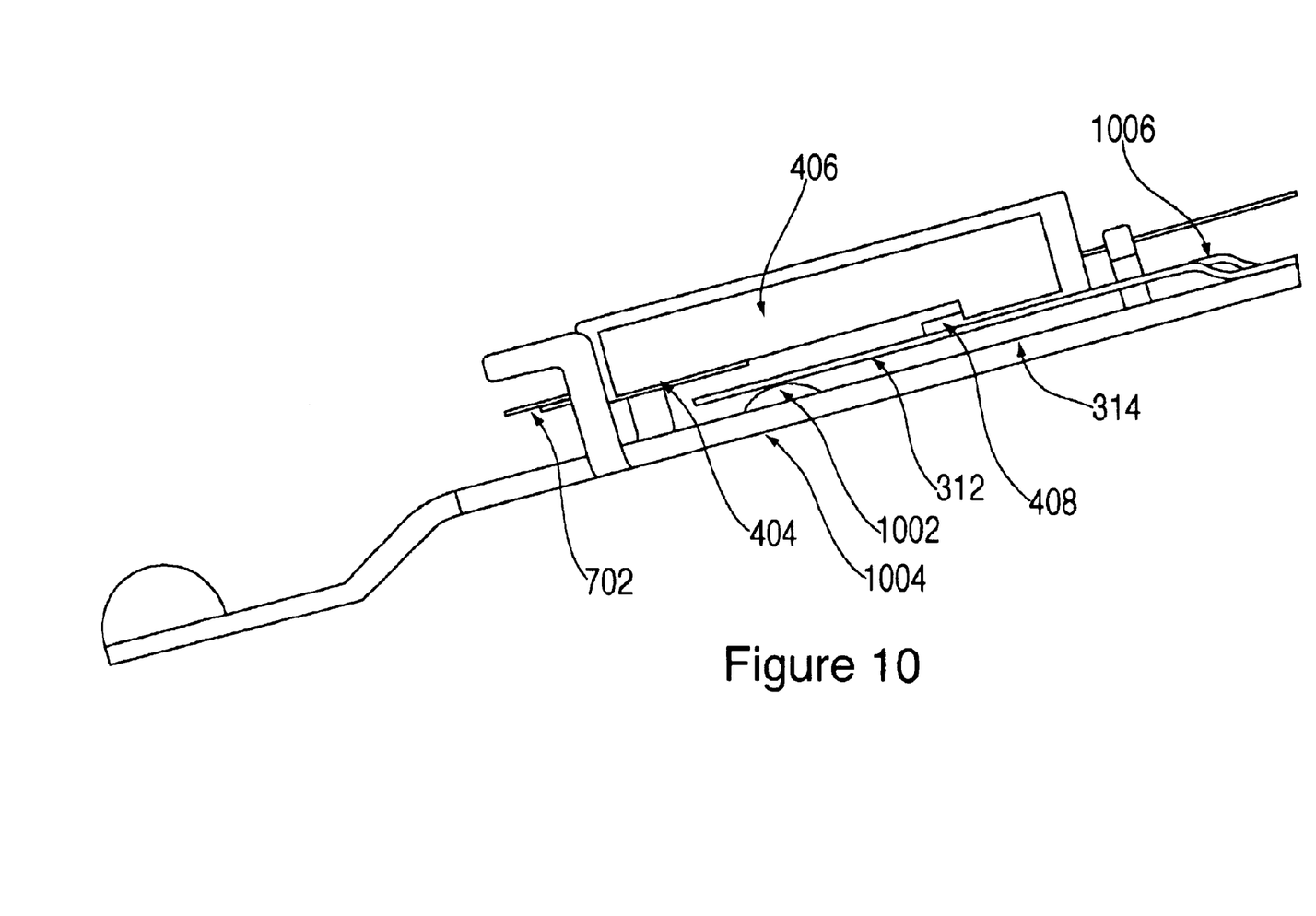
FIG. 10 illustrates in a side view one embodiment of an assembled piezoelectric micro-actuator.

FIG. 10 illustrates in a side view one embodiment of an assembled piezoelectric micro-actuator. In one embodiment, a dimple 1002 on a suspension loadbeam 1004 of the HGA maintains a parallel gap between the suspension tongue 312 and the suspension loadbeam 1004. In a further embodiment, an outrigger 1006 supports the suspension tongue 312.

Figure 11A:
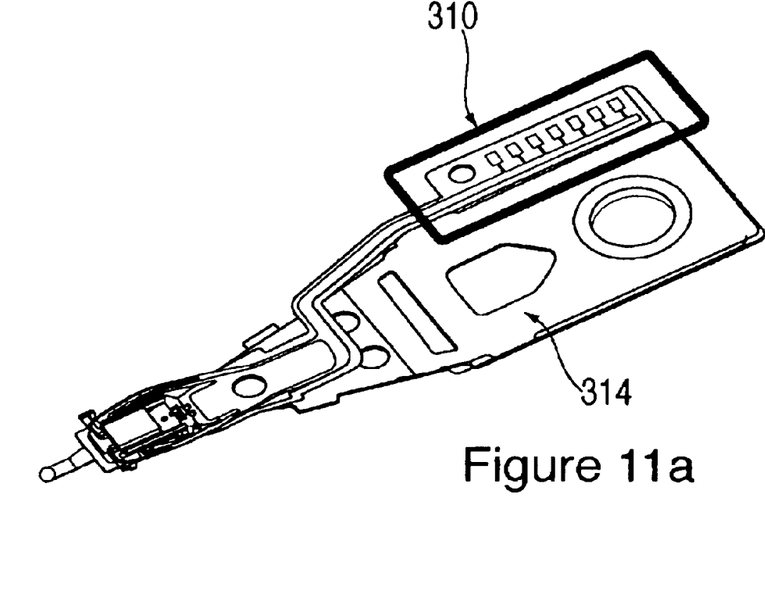
FIGS. 11a–b illustrate one embodiment of the printed circuit assembly.
Figure 11B:
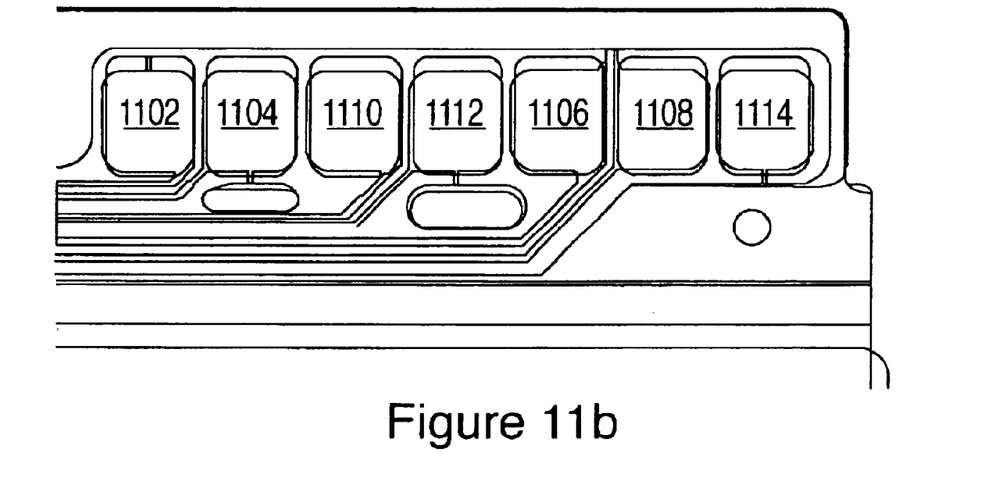

FIG. 11a illustrates one embodiment of the positioning of the printed circuit assembly 310 on the HGA 314. FIG. 11b illustrates one embodiment of the printed circuit assembly 310. In one embodiment, the printed circuit assembly includes a positive write contact pad 1102, a negative write contact pad 1104, a positive read contact pad 1106, and a negative read contact pad 1108. In a further embodiment, the printed circuit assembly includes a first arm contact pad 1110 electrically coupled to the first set of actuator arm pads 806 and a second arm contact pad 1112 electrically coupled to the second set of actuator arm pads 808. In one embodiment, the printed circuit assembly includes a ground 1114.

Figure 12A:
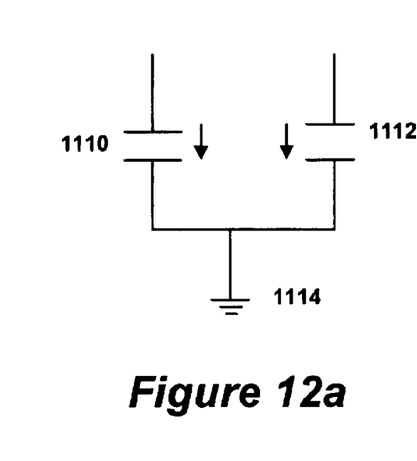
FIGS. 12a–d illustrate the electrical connection and excitation of the first arm contact pad and the second arm contact pad in relation to the ground.
Figure 12B:
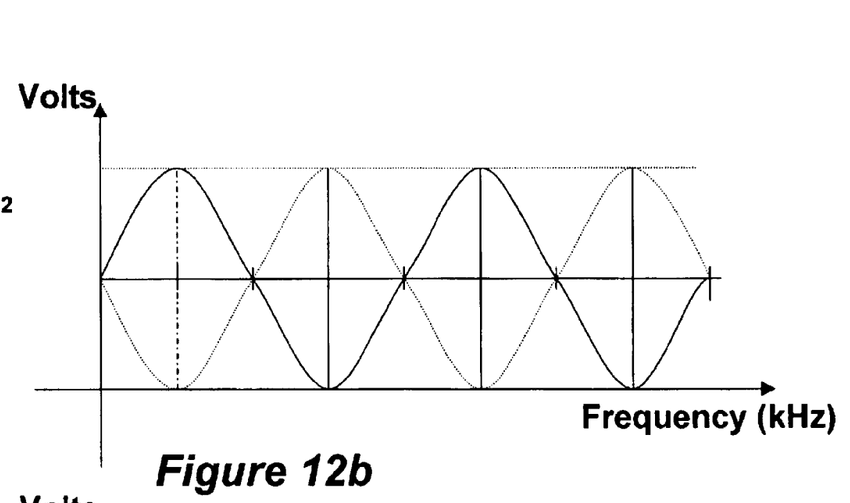
Figure 12C:
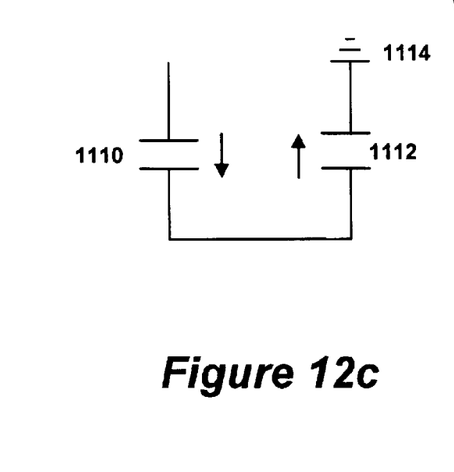
Figure 12D:
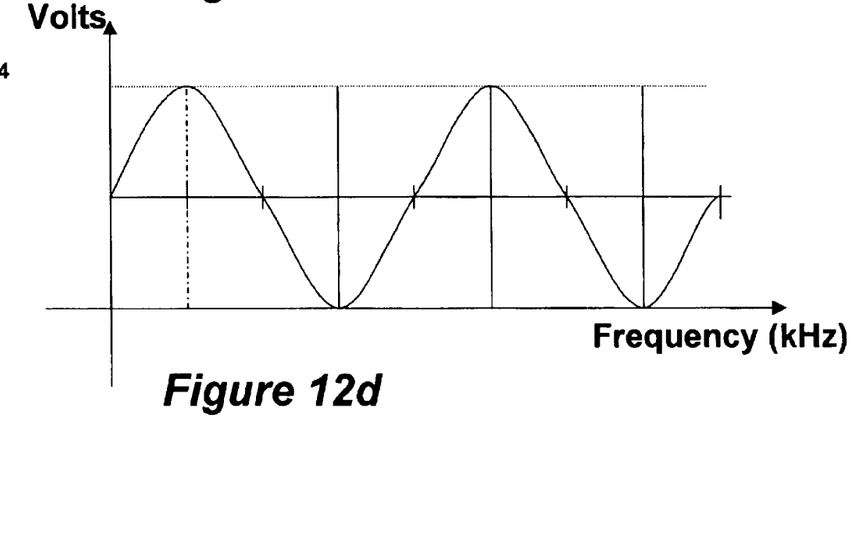

FIG. 12a illustrates one embodiment of the electrical connection of the first arm contact pad 1110 and the second arm contact pad 1112 in relation to the ground 1114. FIG. 12b illustrates in a graph one embodiment of the excitation of the piezoelectric beams 308 for the electrical connection of FIG. 12a, using a different sine waveform for each beam. In one embodiment, this excitation occurs while performing track following and seek settling functions. FIG. 12c illustrates an alternate embodiment of the electrical connection of the first arm contact pad 1110 and the second arm contact pad 1112 in relation to the ground 1114. FIG. 12d illustrates in a graph one embodiment of the excitation of the piezoelectric beams 308 for the electrical connection of FIG. 12c, using a single sine waveform to excite both piezoelectric beams.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A U-shaped micro-actuator, comprising:
  a connection plate to electrically couple a magnetic read/write head of a slider to a printed circuit assembly; and
  a metal framing assembly to allow the slider to move in relation to a head gimbal assembly, wherein the framing assembly includes:
    a base piece coupled to the head gimbal assembly;
    a first arm coupled to a first side of the base and to the slider;
    a first support coupled to the first arm to support the connection plate;
    a second arm coupled to a second side of the base and to the slider; and
    a second support coupled to the second arm to support the connection plate.

2. The micro-actuator of claim 1, wherein the metal framing assembly is comprised of stainless steel.

3. The micro-actuator of claim 1, wherein the metal framing assembly is a 25 μm thickness frame.

4. The micro-actuator of claim 1, further comprising:
  a first strip of piezoelectric actuator material coupled to the first arm; and a second strip of piezoelectric actuator material coupled to the second arm.

5. The micro-actuator of claim 4, wherein the first strip of piezoelectric actuator material is coupled to an exterior side of the first arm and the second strip of piezoelectric actuator material is coupled to an exterior side of the second arm.

6. The micro-actuator of claim 4, wherein the first strip of piezoelectric actuator material is coupled to an interior side of the first arm and the second strip of piezoelectric actuator material is coupled to an interior side of the second arm.

7. The micro-actuator of claim 4, further comprising:
a first set of one or more bonding pads coupled to the first strip of piezoelectric actuator material, the first set of bonding pads to allow the first strip to be electrically coupled to the printed circuit assembly; and
a second set of one or more bonding pads coupled to the second strip of piezoelectric actuator material, the second set of bonding pads to allow the second strip to be electrically coupled to the printed circuit assembly.

8. The micro-actuator of claim 7, wherein the first set of one or more bonding pads receives a first control signal from the printed circuit assembly and the second set of one or more bonding pads receives a second control signal from the printed circuit assembly.

9. The micro-actuator of claim 8, wherein the first control signal is a first phase sine waveform and the second control signal is a second phase sine waveform.

10. The micro-actuator of claim 8, wherein the first set of one or more bonding and the second set of one or more bonding pads receive a single sine waveform as a control signal.

11. The micro-actuator of claim 7, wherein the first set of bonding pads and the second set of bonding pads are electrically coupled to the first and second strip of piezoelectric material by gold ball bonding.

12. The micro-actuator of claim 7, wherein the first set of bonding pads and the second set of bonding pads are electrically coupled to the first and second strip of piezoelectric material by solder bump bonding.

13. The micro-actuator of claim 4, wherein the first strip of piezoelectric actuator material and the second strip of piezoelectric actuator material are coupled to the metal frame assembly by epoxy.

14. The micro-actuator of claim 4, wherein the first strip of piezoelectric actuator material and the second strip of piezoelectric actuator material are multi-layered.

15. The micro-actuator of claim 1, wherein the framing assembly is coupled to a head gimbal assembly and the connection plate by an ultraviolet-cured epoxy.

16. The micro-actuator of claim 1, wherein the connection plate includes a first set of one or more bonding pads dedicated to electrically coupling the read data from the printed circuit to the magnetic read/write head and a second set of one or more bonding pads dedicated to electrically coupling the write data from the printed circuit to the magnetic read/write head.

17. The micro-actuator of claim 1, wherein the metal framing assembly is coupled to a head gimbal assembly and the connection plate by laser welding.

18. A system, comprising:
a disk containing data
a slider with a magnetic read/write head coupled to the framing assembly, the magnetic read/write head to read the data from the disk;
a head gimbal assembly with a suspension tongue, the head gimbal assembly to suspend the slider above the disk;
a printed circuit assembly to control read and write functions of the magnetic read/write head;
a connection plate by which the magnetic read/write head is electrically coupled to the printed circuit assembly; and
a U-shaped micro-actuator having a metal framing assembly to move the slider in relation to the head gimbal assembly, wherein the framing assembly includes:
a base piece coupled to the head gimbal assembly;
a first arm coupled to a first side of the base and to the slider;
a first support coupled to the first arm to support the connection plate;
a second arm coupled to a second side of the base and to the slider; and
a second support coupled to the second arm to support the connection plate.

19. The system of claim 18, wherein the metal framing assembly is comprised of stainless steel.

20. The system of claim 18, wherein the metal framing assembly is a 25 µm thickness frame.

21. The system of claim 18, further comprising:
a first strip of piezoelectric actuator material coupled to the first arm; and
a second strip of piezoelectric actuator material coupled to the second arm.

22. The system of claim 21, wherein the first strip of piezoelectric actuator material is coupled to an exterior side of the first arm and the second strip of piezoelectric actuator material is coupled to an exterior side of the second arm.

23. The system of claim 21, wherein the first strip of piezoelectric actuator material is coupled to an interior side of the first arm and the second strip of piezoelectric actuator material is coupled to an interior side of the second arm.

24. The system of claim 21, further comprising:
a first set of one or more bonding pads coupled to the first strip of piezoelectric actuator material, the first set of bonding pads to electrically couple allow the first strip to be electrically coupled to the printed circuit assembly; and
a second set of one or more bonding pads coupled to the second strip of piezoelectric actuator material, the second set of bonding pads to allow the second strip to be electrically coupled to the printed circuit assembly.

25. The system of claim 21, wherein the first strip of piezoelectric actuator material receives a first control signal from the printed circuit assembly and the second strip of piezoelectric actuator material receives a second control signal from the printed circuit assembly.

26. The system of claim 25, wherein the first control signal is a first phase sine waveform and the second control signal is a second phase sine waveform.

27. The system of claim 25, wherein the first strip of piezoelectric actuator material and the second strip of piezoelectric actuator material receive a single sine waveform as a control signal.

28. The system of claim 24, wherein the first set of bonding pads and the second set of bonding pads are electrically coupled to the first and second strip of piezoelectric material by gold ball bonding.

29. The system of claim 24, wherein the first set of bonding pads and the second set of bonding pads are electrically coupled to the first and second strip of piezoelectric material by solder bump bonding.

30. The system of claim 21, wherein the first strip of piezoelectric actuator material and the second strip of piezoelectric actuator material are coupled to the metal frame assembly by epoxy.

31. The system of claim 21, wherein the first strip of piezoelectric actuator material and the second strip of piezoelectric actuator material are multi-layered.

32. The system of claim 18, wherein the framing assembly is coupled to the head gimbal assembly and the connection plate by an ultraviolet-cured epoxy.

33. The system of claim 18, wherein the connection plate includes a first set of one or more bonding pads dedicated to electrically coupling the read data from the printed circuit to the magnetic read/write head and a second set of one or more bonding pads dedicated to electrically coupling the write data from the printed circuit to the magnetic read/write head.

34. The system of claim 18, wherein the metal framing assembly is coupled to the head gimbal assembly and the connection plate by laser welding.

35. The system of claim 18, wherein the suspension tongue has a dimple to maintain the parallel gap between the metal framing assembly and the suspension tongue.

* * * * *

UNITED STATES PATENT AND TRADEMARK OFFICE
CERTIFICATE OF CORRECTION

| | | |
|---|---|---|
| PATENT NO. | : 6,950,288 B2 | Page 1 of 1 |
| APPLICATION NO. | : 10/352727 | |
| DATED | : September 27, 2005 | |
| INVENTOR(S) | : Ming Gao Yao et al. | |

It is certified that error appears in the above-identified patent and that said Letters Patent is hereby corrected as shown below:

Column 2, Line 46 "projecting" should be --project--

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,950,288 B2 Page 1 of 1
APPLICATION NO. : 10/352757
DATED : September 27, 2005
INVENTOR(S) : Ming Gao Yao et al.

It is certified that error appears in the above-identified patent and that said Letters Patent is hereby corrected as shown below:

Column 2, Line 46 "projecting" should be --project--

This certificate supersedes Certificate of Correction issued July 11, 2006.

Signed and Sealed this

First Day of August, 2006

JON W. DUDAS
*Director of the United States Patent and Trademark Office*